United States Patent
Walker et al.

(10) Patent No.: US 6,332,218 B1
(45) Date of Patent: *Dec. 18, 2001

(54) SYSTEM AND METHOD FOR AUTOMATICALLY INSTANTIATING CLASSES IN A VIRTUAL MACHINE

(75) Inventors: William D. Walker, Nashua, NH (US); Peter A. Korn, Oakland, CA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,015

(22) Filed: Jun. 30, 1998

(51) Int. Cl.[7] ............................................. G06F 9/445
(52) U.S. Cl. ........................................... 717/11; 713/2
(58) Field of Search ............................... 395/712; 717/5, 717/1, 11, 2

(56) References Cited

U.S. PATENT DOCUMENTS

| | | | | |
|---|---|---|---|---|
| 5,815,415 | * | 9/1998 | Bentley et al. ..................... | 364/578 |
| 5,815,709 | * | 9/1998 | Waldo et al. ...................... | 395/683 |
| 5,893,118 | * | 4/1999 | Sonderegger ...................... | 707/203 |
| 5,909,575 | * | 6/1999 | Perry ................................. | 713/100 |
| 5,923,884 | * | 7/1999 | Peyret et al. ...................... | 717/11 |
| 6,117,187 | * | 9/2000 | Staelin ............................... | 717/11 |

OTHER PUBLICATIONS

Jensen et al. Security and Dyamic Class Loading in Java: A Formalisation. IEEE. pp. 4–15, Feb. 1998.*

* cited by examiner

*Primary Examiner*—Tuan Q. Dam
*Assistant Examiner*—Wei Zhen
(74) *Attorney, Agent, or Firm*—Kudirka & Jobse, LLP

(57) ABSTRACT

A program loading arrangement is used in connection with a virtual machine for loading programs for processing in the virtual machine. The program loading arrangement includes a program/class loader and a dependency list. The dependency list identifies, for each program for which one or more classes are to be instantiated in the virtual machine for use during processing of the respective program, the class or classes that are to be so instantiated. In response to a request to load a program for processing in the virtual machine, the program/class loader initiates loading of the program. In addition, the program/class loader determines from the dependency list whether any classes are to be instantiated for use during processing of the program being loaded and, if so, instantiates the respective classes. The information in the dependency list as to which class or classes are to be instantiated in the virtual machine when the respective programs are loaded can be provided by an operator, thereby to permit the operator to enable classes to be instantiated in the virtual machine which might not otherwise be instantiated for use during processing of the program.

15 Claims, 3 Drawing Sheets

SYSTEM AND METHOD FOR AUTOMATICALLY INSTANTIATING CLASSES IN A VIRTUAL MACHINE

FIELD OF THE INVENTION

The invention relates generally to the field of digital computer systems, and more particularly to arrangements for loading of programs and other elements by a virtual machine executing in such digital computer systems. The invention particularly provides a new system and method for, when virtual machine loads a program for execution by the virtual machine, also enabling it (that is, the virtual machine) to automatically instantiate selected classes as objects to be used in connection with execution of the program, even if the program is not aware of and does not need the objects for its execution. By having the virtual machine automatically load such classes along with a program, the digital computer system may provide services which the program itself does not provide, but which the digital computer system's operator may wish to have provided, which, in turn, are provided by the objects which are instantiated from the selected classes.

BACKGROUND OF THE INVENTION

The development of inexpensive and high-powered computer systems, such as personal computers, computer workstations and the like has led to an increase in the availability of sophisticated computer technology to large numbers of people, Generally, a personal computer, workstation or the like includes processor, a video display through which the computer can display information to an operator, and operator input devices such as a keyboard, a pointing devices such as a mouse or the like, which the operator can use to input information to the computer. The development of graphical user interfaces (GUI's) has made computers easier for many to use. In a graphical user interface, the computer displays information to an operator in graphical form on a video display, and allows the operator to manipulate the displayed graphical information to control the computer by manipulating the pointing device.

Digital computer systems execute programs in execution environment in the form of a virtual machine. In some cases, it is desirable to be able to, when an application program is loaded into a virtual machine for processing, other elements, identified herein as "classes," are also loaded and instantiated as objects which are also available for processing along with the application program that is to be loaded. This would allow for instantiation of object for use in processing along with the program that is loaded, even if the program is not aware of the existence of the instantiated classes and was not developed for use therewith. This can be useful in connection with, for example, use of technologies, such as "assistive technologies" which an operator may want to use along with programs being processed, even if the programs themselves were not developed for use with the respective technologies.

Assistive technologies typically are used to assist operators who have various kinds of disabilities to use computers, may need to receive notifications of events so that they can perform an operation which can, for example, provide a non-visual indication of the event. Thus, an assistive technology which is used in connection with a graphical user interface may, when an event occurs in connection with an object in the graphical user interface which would typically be displayed on the digital computer system's video display to provide a visual notification of the event to the operator, also enable speakers to generate an audible notification of the event to the operator. Accordingly, the assistive technology can assist a sight-impaired person to use the computer. To accomplish that, the assistive technology will need to be instantiated in the virtual machine along with the application program for events are being generated in the graphical user interface so that it (that is, the assistive technology) can receive notification of events in connection with the graphical user interface objects. However, the application programs which are being loaded may not be aware of the existence of the assistive technologies, and so they (that is, the application programs) would not be able to notify the virtual machine that it (that is the virtual machine) should load the assistive technologies when it loads the application program.

SUMMARY OF THE INVENTION

The invention provides a new and improved arrangement for use in a digital computer system for automatically instantiating selected classes in a virtual machine when a program is loaded by the virtual machine. By having the virtual machine automatically load such classes along with a program, the digital computer system may provide services which the program itself does not provide, but which the digital computer system's operator may wish to have provided, which, in turn, are provided by the objects which are instantiated from the selected classes.

In brief summary, the invention provides a program loading arrangement for use in connection with a virtual machine for loading programs for processing in the virtual machine. The program loading arrangement includes a program/class loader and a dependency list. The dependency list identifies, for each program for which one or more classes are to be instantiated in the virtual machine for use during processing of the respective program, the class or classes that are to be so instantiated. In response to a request to load a program for processing in the virtual machine, the program/class loader initiates loading of the program. In addition, the program/class loader determines from the dependency list whether any classes are to be instantiated for use during processing of the program being loaded and, if so, instantiates the respective classes. The information in the dependency list as to which class or classes are to be instantiated in the virtual machine when the respective programs are loaded can be provided by an operator, thereby to permit the operator to enable classes to be instantiated in the virtual machine which might not otherwise be instantiated for use during processing of the program.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
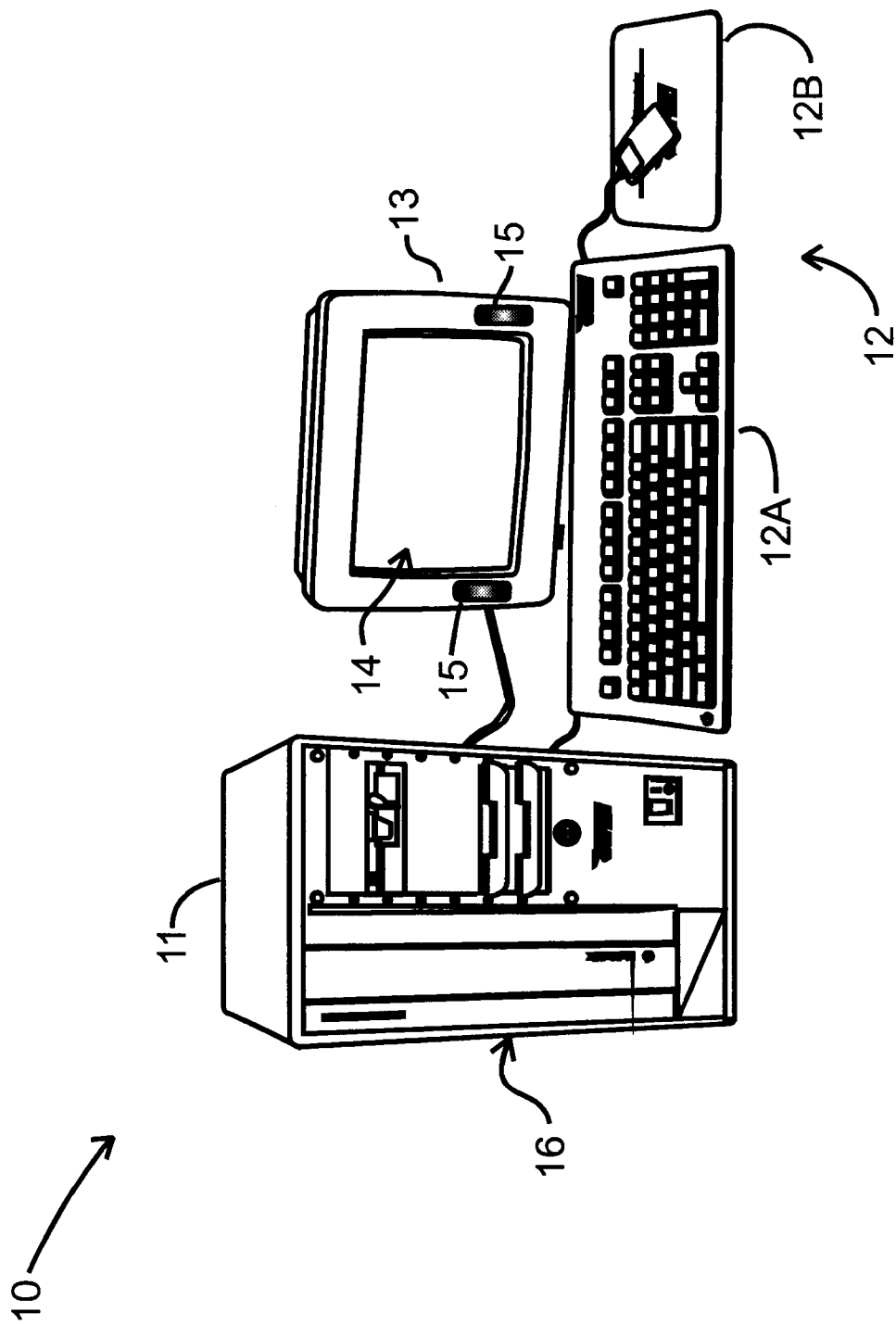
FIG. 1 depicts an illustrative digital computer system including an automatic class instantiation arrangement for automatically instantiating selected classes in a virtual machine when a program is loaded by the virtual machine.

FIG. 1 depicts an illustrative digital computer system 10 including an event notification arrangement for providing notification of events in connection with the various objects and other elements of a graphical user interface ("GUI") which normally would be displayed on a video display device, to programs which control processing by the digital computer systems in connection therewith. With reference to FIG. 1, the computer system 10 in one embodiment includes a processor module 11 and operator interface elements comprising operator input components such as a keyboard 12A and/or a mouse 12B (generally identified as operator input element(s) 12) and operator output components such as a video display device 13 with integral speakers 15. The illustrative computer system 10 is of the conventional stored-program computer architecture.

The processor module 11 includes, for example, processor, memory and mass storage devices such as disk and/or tape storage elements (not separately shown) which perform processing and storage operations in connection with digital data provided thereto. The mass storage subsystems may include such devices as disk or tape subsystems, optical disk storage devices and CD-ROM devices in which information may be stored and/or from which information may be retrieved. One or more of the mass storage subsystems may utilize removable storage media which may be removed and installed by an operator, which may allow the operator to load programs and data into the digital computer system 10 and obtain processed data therefrom. Under control of control information provided thereto by the processor, information stored in the mass storage subsystems may be transferred to the memory for storage. After the information is stored in the memory, the processor may retrieve it from the memory for processing. After the processed data is generated, the processor may also enable the mass storage subsystems to retrieve the processed data from the memory for relatively long-term storage.

The operator input element(s) 12 are provided to permit an operator to input information for processing and/or control of the digital computer system 10. The video display device 13 and speakers 15 are provided to, respectively, display visual output information on a screen 14, and audio output information, which are generated by the processor module 11, which may include data that the operator may input for processing, information that the operator may input to control processing, as well as information generated during processing. The processor module 1I1 generates information for display by the video display device 13 using a so-called "graphical user interface" ("GUI"), in which information for various applications programs is displayed using various windows, icons and other objects. Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

In addition, the processor module 11 may include one or more network or communication ports, generally identified by reference numeral 15, which can be connected to communication links to connect the computer system 10 in a computer network, or to other computer systems (not shown) over, for example, the public telephony system. The ports enable the computer system 10 to transmit information to, and receive information from, other computer systems and other devices in the network.

Generally, the digital computer system 10 executes a program under control of a control program, which, in turn, provides an execution environment in the form of a virtual machine. The invention provides an arrangement in which, when the virtual machine loads the application program processing, it (that is, the virtual machine) also can load and instantiate additional elements, identified herein as "classes," as objects which are also available for processing along with the application program that is to be loaded. This arrangement allows the virtual machine to instantiate classes for use in processing along with the program that is loaded, even if the program is not aware of the existence of the instantiated classes and was not developed for use therewith. The arrangement facilitates use of technologies, such as "assistive technologies" which can be used with the virtual machine and which an operator may want to use along with programs being processed in the virtual machine, even if the programs themselves were not developed for use with the respective technologies.

Assistive technologies typically are used to assist operators who have various kinds of disabilities to use computers, may need to receive notifications of events so that they can perform an operation which can, for example, provide a non-visual indication of the event. Thus, an assistive technology which is used in connection with a graphical user interface may, when an event occurs in connection with an object in the graphical user interface which would typically be displayed on the video display device 13 to provide a visual notification of the event to the operator, also enable the speakers 15 to generate a sound when the event occurs, thereby to provide an audible notification of the event to the operator. Thus, the assistive technology can assist a sight-impaired person to use the computer, but it will be appreciated that, to accomplish that, the assistive technology will need to be instantiated in the virtual machine along with the application program for events are being generated in the graphical user interface so that it (that is, the assistive technology) can receive notification of events in connection with the graphical user interface objects. However, the application programs which are being loaded may not be aware of the existence of the assistive technologies, and so they (that is, the application programs) would not be able to notify the virtual machine that it (that is the virtual machine) should load the assistive technologies when it loads the application program.

Figure 2:
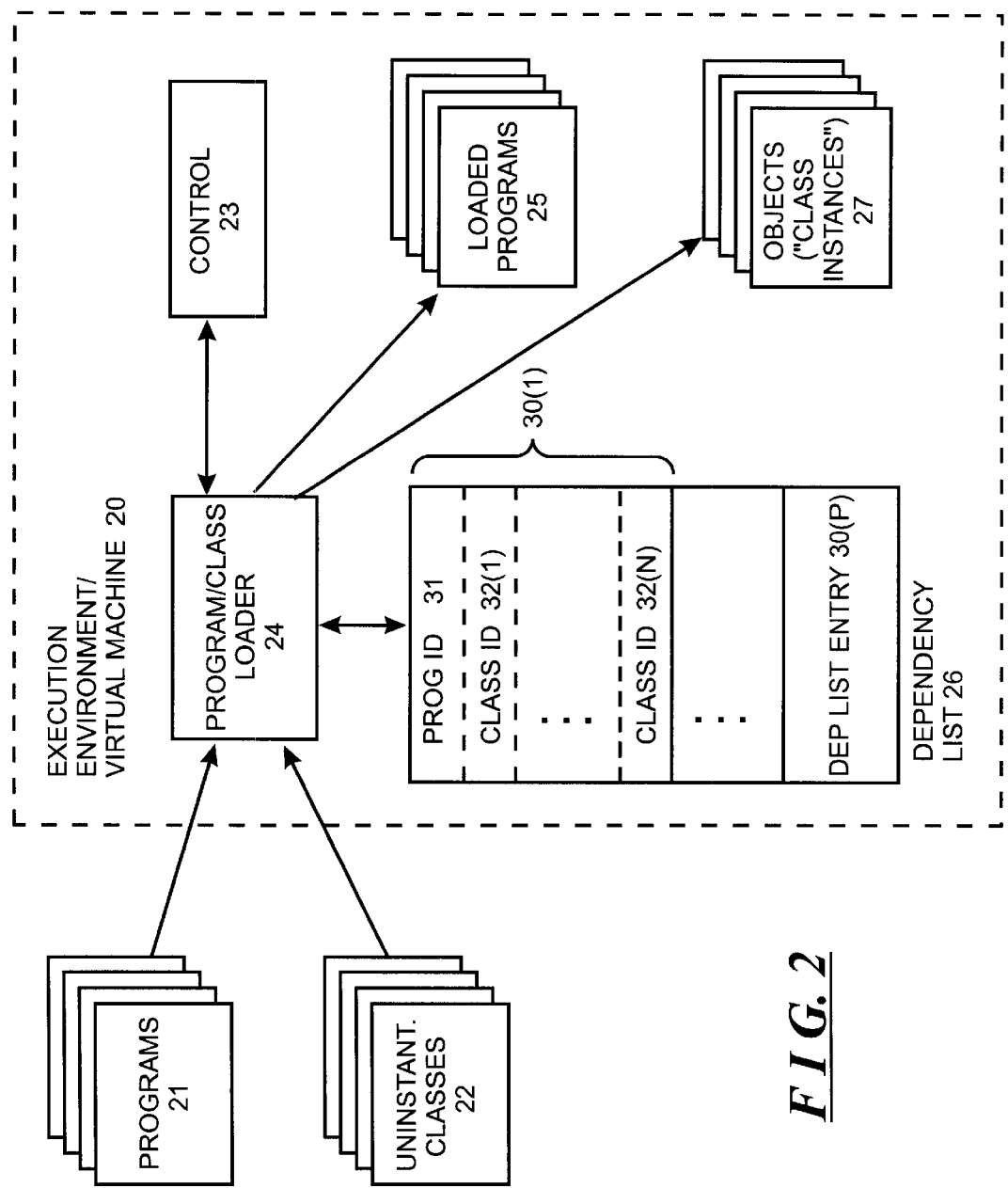
FIG. 2 is a functional block diagram of an automatic class instantiation arrangement constructed in accordance with the invention.
Figure 3:
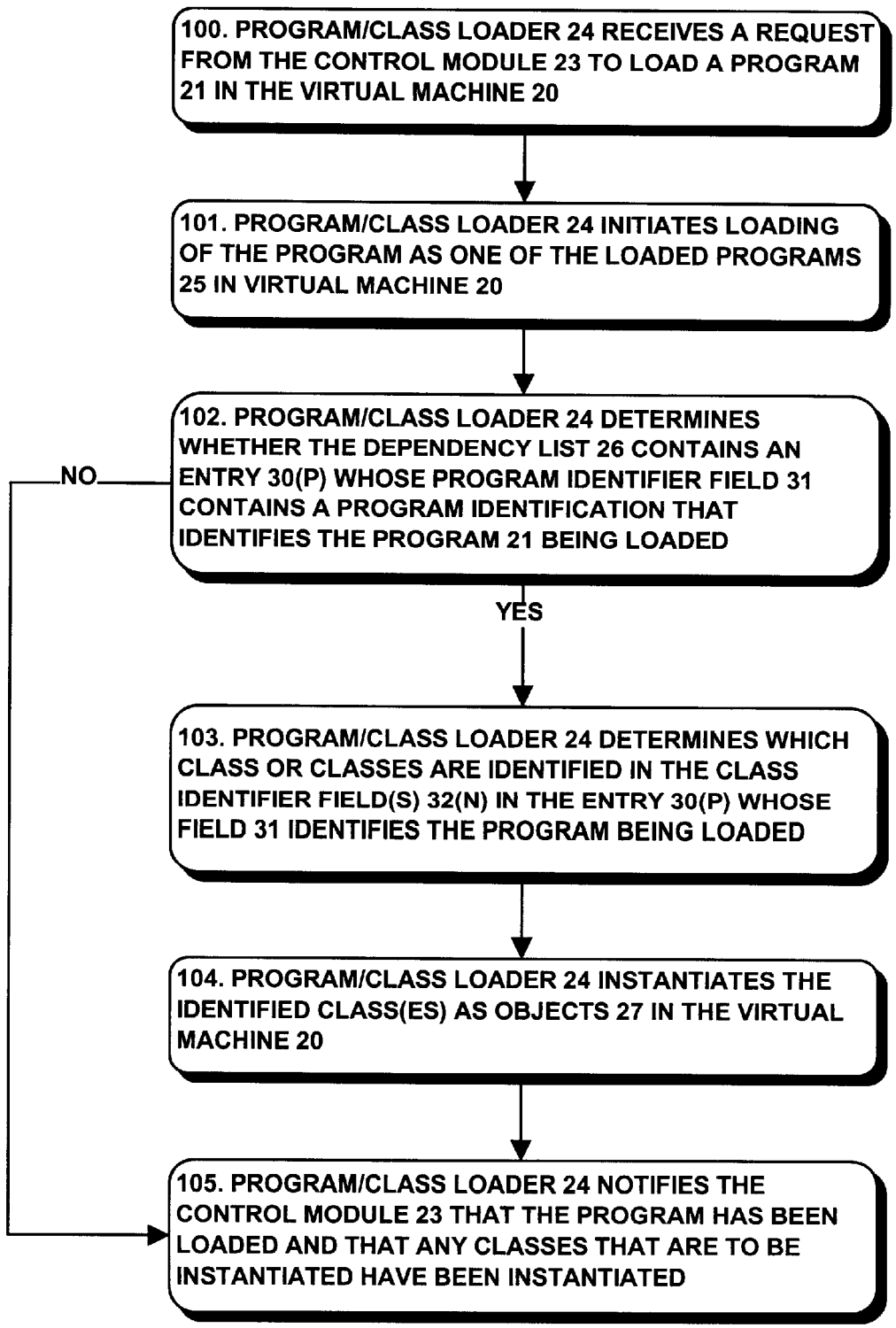
FIG. 3 is a flow chart depicting operations performed by the automatic class instantiation arrangement depicted in FIG. 2.

The invention provides an arrangement, described in connection with FIGS. 2 and 3, for enabling a virtual machine to automatically instantiate classes, such as assistive technologies, as objects in the virtual machine for processing along with an application program, when the application program is loaded in the virtual machine for processing. FIG. 2 is a functional block diagram of an automatic class instantiation arrangement constructed in accordance with the invention, and FIG. 3 is a flowchart depicting operations performed by the arrangement depicted in FIG. 2 in connection with the invention. With reference initially to FIG. 2, the automatic class instantiation arrangement includes a virtual machine 20, which operates as an execution environment for processing one or more application programs 21 and objects instantiated from one or more classes 22. The virtual machine 20 includes a control module 23, a program/class loader 24 and a dependency list 26. The control module 23, enables the program/class loader to load respective ones of the programs 21 into the virtual machine 20, which are identified by reference numeral 25, for processing. In addition, the control module 23 can enable the program/class loader 24 to instantiate respective ones of the classes 22 in the virtual machine as objects ("class instances") 27. After a program 26 has been loaded in the virtual machine 20, it can be executed, also under control of the control module 23. In addition, after an object 27 has been instantiated in the virtual machine 20, it is available for processing under control of the control module 23.

In accordance with the invention, the dependency list 26 identifies, for each program which can be loaded in the virtual machine 20, ones of the classes 22 which the program/class loader 24 is to instantiate in the virtual machine when the respective program is loaded. When the control module 23 enables the program/class loader to load a program 21 in the virtual machine, the program/class loader can scan the dependency list 26 to determine whether any classes are to be instantiated in the virtual machine as a class instance, and, if so, which classes. If the dependency list 26 indicates that one or more classes are to be instantiated, the program/class loader 24 can instantiate the classes 22, as respective objects ("class instances") 27 for processing along with the program. After the program has been loaded and the classes identified by the dependency list have been instantiated, the program/class loader 24 can enable the control module 23 to begin processing the program, in conjunction with the loaded classes.

The dependency list 26 includes one or more entries 30(1) through 30(P) (generally identified by reference numeral 30(p), each of which is associated with a respective one of the programs 21. Each entry 30(p) includes a program identifier field 31 and one or more class identifier fields 32(1) through 32(N) (generally identified by reference numeral 32(n)). The program identifier field 31 identifies one of the programs 21 which can be loaded in the virtual machine 20, and each of the class identifier fields 32(n) identifies one of the classes 22 which may be instantiated in the virtual machine. Each of the entries 30(p), along with the contents of the respective fields 31 and 32(n), may be established in response to input information provided by an operator in a conventional manner. Thus, the dependency list 26 allows the operator to indicate, when a program is loaded in the virtual machine 20, whether any classes 22 are to be instantiated in the virtual machine 20 along with the virtual machine, and if so, which classes. It will be appreciated that, if, when a program 21 is loaded in the virtual machine 20, no classes 22 are to be instantiated in the virtual machine 20 with the program 21, or if the program 21 itself enables all of the classes 22 that the operator wishes to have instantiated in the virtual machine 20 for use during processing of the program 21, the operator need not enable an entry 30(p) to be established for the program 21. However, if the operator wishes to have a class 22 instantiated in the virtual machine 20 for use during processing of a program, but the class 22 is not otherwise instantiated, he or she can enable the program/class loader 24 to instantiate the class 22 by providing an entry 26 for the program 21 in the dependency list 26 and identify the program in field 31 and the class 22 in a field 32(n) in the entry 30(p).

FIG. 3 is a flow chart depicting operations performed by the automatic class instantiation arrangement depicted in FIG. 2 when, in conjunction with loading of a program, automatically instantiating classes identified in the dependency list 26. With reference to FIG. 3, when the program/class loader 24 receives a request from the control module 23 to load a program 21 in the virtual machine 20 (step 100), it (that is, the program/class loader 24) will initiate loading of the program as one of the loaded programs 25 (step 101). In connection with loading of the program in step 101, if the program itself identifies one or more classes 22 that are to be loaded along therewith, the program/class loader 24 will also load those classes in connection with step 101. In addition, the program/class loader 24 will determine whether the dependency list 26 contains an entry 30(p) whose program identifier field 31 contains a program identification that identifies the program 21 being loaded (step 102). If the program/class loader 24 makes a positive determination in step 102, it will determine which class or classes are identified in the class identifier field(s) 32(n) in the entry 30(p) whose field 31 identifies the program being loaded (step 103) and instantiate the identified classes as objects 27 in the virtual machine 20 (step 104). After the program/class loader 24 has loaded the program in step 101 and instantiated the class or classes identified in the dependency list in step 104, or following step 102 if it (that is, the program/class loader 24) makes a negative determination in that step, it will so notify the control module 23 (step 105). Following step 105, the control module 23 can begin processing of the loaded program, along with the instantiated classes.

The invention provides a number of advantages. In particular, the invention provides an arrangement which facilitates the automatic instantiation of classes which an operator may wish to have available in a virtual machine when a program is loaded, so as to allow the operator to have available services which the program may not otherwise provide.

It will be appreciated that a number of modifications may be made to the arrangement as described above in connection with FIGS. 1 through 3. Although the invention has been described in connection with assistive technology classes, it will be appreciated that the invention will be useful in connection with other classes related to other types of technologies.

In addition, although the dependency list 26 has been described as including an entry 30(p) for each program 21 which can be loaded for which a class 22 is to be automatically instantiated, it will be appreicated that other arrangements 26 may be used for the dependency list 26. For example, if one or more classes 22 are to be instantiated for all programs 21 which may be loaded, or for all programs of a particular type, the dependency list 26 can include a default entry 30(d) which identifies the classes that are to be so instantiated. In addition to the default entry 30(d), the dependency list 26 can also include an entry 30(p) (p≠d) associated with each program 21 for which classes in addition to the default classes are to be instantiated which identify the additional classes that are to be instantiated when the respective program 21 is loaded.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. An arrangement for loading a program in a virtual machine in a digital computer system comprising:

a dependency list that identifies at least one class that is associated with said program but is not a part of said program; and a program/class loader adapted to load said program in said virtual machine, said program/class loader further being adapted to determine whether the dependency list identifies a class that is associated with said program, but not part of said program and, if so, to instantiate the class in the virtual machine so that an object instantiated from the class will be available in the virtual machine together with the program at runtime.

2. An arrangement as defined in claim 1, the arrangement being adapted to load a select one of a plurality of programs in the virtual machine, the dependency list identifying, associated with each program for which at least one class that is not part of the each program, but is to be instantiated in the virtual machine, one or more such classes.

3. An arrangement as defined in claim 2 in which the dependency list includes at least one entry, the entry identifying at least one class that is not part of, but is associated with, at least one program.

4. An arrangement as defined in claim 3 in which said at least one entry comprises a default entry, the default entry identifying at least one class that is not part of any of said programs, but is to be instantiated when any of said programs is loaded in the virtual machine.

5. An arrangement as defined in claim 1 in which the identification in the dependency list of the classes that are not part of, but are associated with, the program, is provided by an operator of the digital computer system.

6. A method of loading a program in a virtual machine in a digital computer system comprising the steps of:

providing a dependency list that identifies at least one class that is associated with said program but is not a part of said program; and loading said program in a virtual machine; and determining whether the dependency list identifies a class that is associated with said program but is not a part of said program and if so, instantiating the class in the virtual machine so that an object instantiated from the class will be available in the virtual machine together with the program at runtime.

7. A method as defined in claim 6 for which a selected one of a plurality of programs can be loaded in the virtual machine, the dependency list identifying, associated with each program for which at least one class that is not part of the each program, but is to be instantiated in the virtual machine, one or more such classes.

8. A method as defined in claim 7 in which the dependency list includes at least one entry, the entry identifying at least one class that is not part of, but is associated with, at least one program.

9. A method as defined in claim 8 in which said at least one entry comprises a default entry, the default entry identifying at least one class that is not part of any of said programs, but is to be instantiated when any of said programs is loaded in the virtual machine.

10. A method as defined in claim 6 further comprising the step of receiving, for the dependency list, the identification of the class that are not part of, but are associated with, the program from an operator of the digital computer system.

11. A computer program product for use in connection with a digital computer system for facilitating the loading of a program in a virtual machine in the digital computer system, the computer program product comprising a computer-readable medium having encoded thereon:

a dependency list module configured to enable the digital computer system to maintain a dependency list that identify at least one class that is associated with said program but is not a part of said program; and a program load module configured to enable the digital computer system to load said program in said virtual machine; and a class instantiation module configured to enable the digital computer system to determine whether the dependency list identifies a class that is associated with said program, but is not part of said program and, if so, to instantiate the class in the virtual machine so that an object instantiated from the class will be available in the virtual machine together with the program at runtime.

12. A computer program product as defined in claim 11 for which a selected one of a plurality of programs can be loaded in the virtual machine, the dependency list module being configured to enable the digital computer system to maintain the dependency list to identify, associated with each program for which at least one class that is not part of the each program, but is to be instantiated in the virtual machine, one or more such classes.

13. A computer program product as defined in claim 12 in which the dependency list module is configured to enable the digital computer system to maintain the dependency list to include at least one entry, the entry identifying at least one class that is not part of, but is associated with at least one program.

14. A computer program product as defined in claim 13 in which said dependency list module is configured to enable the dependency list to include at leas tone entry comprising a default entry, the default entry identifying at least one class that is not part of any of said programs, but is to be instantiated when any of said programs is loaded in the virtual machine.

15. A computer program product as defined in claim 11 further comprising an operator input module configured to enable the computer to receive the identification of the class that is not part of, but is associated with, the program for the dependency list from an operator of the digital computer system.

* * * * *